United States Patent [19]

Jennings, Jr.

[11] Patent Number: 5,238,067
[45] Date of Patent: Aug. 24, 1993

[54] IMPROVED MEANS OF FRACTURE ACIDIZING CARBONATE FORMATIONS

[75] Inventor: Alfred R. Jennings, Jr., Plano, Tex.
[73] Assignee: Mobil Oil Corporation, Fairfax, Va.
[21] Appl. No.: 883,999
[22] Filed: May 18, 1992
[51] Int. Cl.$^5$ ............................................. E21B 43/26
[52] U.S. Cl. ..................................... 166/307; 166/308
[58] Field of Search ............... 166/307, 308, 273, 310, 166/305.1, 281, 271

[56] References Cited

U.S. PATENT DOCUMENTS

| | | | |
|---|---|---|---|
| 2,850,098 | 9/1958 | Moll et al. | 166/42 |
| 3,076,762 | 2/1963 | Dill | 252/8.55 |
| 3,127,937 | 4/1964 | McGuire, Jr. et al. | 166/281 X |
| 3,155,159 | 11/1964 | McGuire, Jr. et al. | 166/281 X |
| 3,233,672 | 2/1966 | Carpenter | 166/42 |
| 3,354,957 | 11/1967 | Every et al. | 166/39 |
| 4,044,833 | 8/1977 | Volz | 166/308 X |
| 4,067,389 | 1/1978 | Savins | 166/246 |
| 4,156,464 | 5/1979 | Hussin | 166/307 X |
| 4,157,116 | 6/1979 | Coulter | 166/280 |
| 4,378,845 | 4/1983 | Medlin et al. | 166/297 |
| 4,478,282 | 10/1984 | Nolte et al. | 166/308 X |
| 4,479,543 | 10/1984 | Kalfayar et al. | 166/307 X |
| 4,787,456 | 11/1988 | Jennings, Jr. et al. | 166/281 |
| 4,887,670 | 12/1989 | Lord et al. | 166/308 X |
| 5,111,881 | 5/1992 | Soliman et al. | 166/308 X |
| 5,159,979 | 11/1992 | Jennings, Jr. | 166/308 X |

Primary Examiner—Terry Lee Melius
Attorney, Agent, or Firm—Alexander J. McKillop; George W. Hager, Jr.; Charles A. Malone

[57] ABSTRACT

This invention is directed to a method to improve fracture acidizing in a carbonate containing formation. Initially, the formation is hydraulically fractured so as to form a fracture in the formation in a preferred direction. Thereafter, an acid is directed into the fracture so as to etch the fracture's face and create channels therein. Afterwards, a viscous fluid is directed into the fracture which fluid contains a material sufficient to serve as a diverter and prevent growth in the existing fracture. Once the diverting material is in place, hydraulic fracturing is again conducted within the existing fracture whereupon fracturing forces are directed away from the diverter so as to form a branched fracture to contact hydrocarbonaceous vugs in the formation. The steps of fracturing acidizing, and diverting are continued until a vuggy area in the formation has been interconnected with the fracture system.

12 Claims, 2 Drawing Sheets

IMPROVED MEANS OF FRACTURE ACIDIZING CARBONATE FORMATIONS

FIELD OF THE INVENTION

This invention is directed to the treatment of a subterranean carbonate formation where an acid is used in combination with a gelled fluid to improve the effectiveness of fracture acidizing.

BACKGROUND OF THE INVENTION

It is a common practice to acidize subterranean formations in order to increase the permeability thereof. For example, in the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in fracture acidizing where pressures, high formation temperatures, and high acid solubility greatly limit the amount of formation that can be contacted by unreacted ("live") acid before it spends on the formation rock. As the acidizing fluid is forced from the well into the propagating fracture, the acid reacts rapidly with the calcareous material immediately adjacent to the fracture. Thus, the acid becomes spent before it penetrates into the formation a significant distance from the fracture. For example, in fracture acidizing of a limestone formation, it is common to by-pass vugs ("high pores") as the fracture often propagates too fast to interconnect with the vugs. Therefore, the porosity of the vuggy formation is not sufficiently increased because many of the vugs are not interconnected. As a result, hydrocarbonaceous fluids contained in the vugs are not removed and the formation or reservoir is not sufficiently drained. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which an inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation to form hydrochloric acid which then attacks the formation.

From these teachings it is apparent that there are numerous limitations to present methods of fracture acidizing and diverting techniques. One major limitation is that the acid reaction begins in a propagating fracture with no substantial resistance. Due to the speed of the propagating fracture, some areas of the formation near the fracture receive no acid to increase the porosity of the formation.

Therefore, what is needed is a method to improve fracture acidizing by increasing fracture communication with large hydrocarbonaceous fluid containing pores so as to increase the porosity of a formation thereby substantially increasing the drainage of hydrocarbonaceous fluids from the formation.

SUMMARY OF THE INVENTION

This invention is directed to a method for improved fracture acidizing in a carbonate containing formation. Initially, the formation is hydraulically fractured via a wellbore thereby forming a hydraulic fracture. Thereafter, an acid sufficient to dissolve the carbonate containing formation is introduced into the fracture where it etches the fracture's face which causes channels to form therein. Next, a viscous fluid containing a diverting material sufficient to prevent fracture growth is directed into the fracture. Said material temporarily closes off existing areas of the fracture which precludes additional fluid from entering these areas.

Subsequently, hydraulic fracturing is again commenced via said wellbore into the existing fracture whereupon fracturing forces by-pass areas which have been precluded from receiving additional fluid flow by the diverting material. Thus, the fracturing forces are directed away from the first fracture into an area of the formation which has not been previously fractured. As the fracture grows, it is directed into an unfractured area where it enters vugs that have hydrocarbonaceous fluids therein.

Afterwards, fracturing pressure is removed from the formation and additional acid is directed into the fracture so as to etch the fracture and create additional channels. Once additional channels have been formed, a viscous fluid containing a solidifiable diverting material which forms a solid barrier sufficient to prevent fluid flow is directed into the existing fracture system. As done previously, hydraulic fracturing is conducted via the well which creates another extension of the fracture system as the fracturing forces by-pass areas of the formation from which fluid flow has been precluded.

Extension of the fracture system causes additional vugs to fluidly communicate therewith while displacing the acid further into the formation. The steps of acidizing, closing existing fractures, and fracturing are repeated until a fracture system has been created which can fluidly communicate with a desired vuggy area of the formation. When a vuggy area of the formation has been fractured as desired, the solid diverting material within the fracture system is allowed to degrade and flow from the fracture system. After the degraded material has been removed from the fracture system, hydrocarbonaceous fluids are allowed to flow from vugs within the formation for substantially increased drainage of the formation.

It is therefore an object of this invention to cause acid to contact substantially greater vuggy areas in a formation than is presently possible.

It is another object of this invention to provide for a method of fracture acidizing by utilizing a solidifiable gel with gel breakers therein to form a solid gel in a desired area of a formation so to redirect fracturing forces into another vuggy area of the formation.

It is still another object of this invention to use a solid diverting material which will liquefy so as to cause acid to be diverted further in the formation and subsequently cause the diverting agent to be removed once the gel breaks.

It is still yet another object of this invention to maintain and increase the permeability of a carbonate formation during fracture acidizing by the use of a liquefiable solid gel or other solid diverting material.

It is yet still another object of this invention to obtain a more efficient fracture acidizing of a formation while substantially reducing the volume of acid utilized.

DESCRIPTION OF THE PREFERRED EMBODIMENTS

Figure 1:
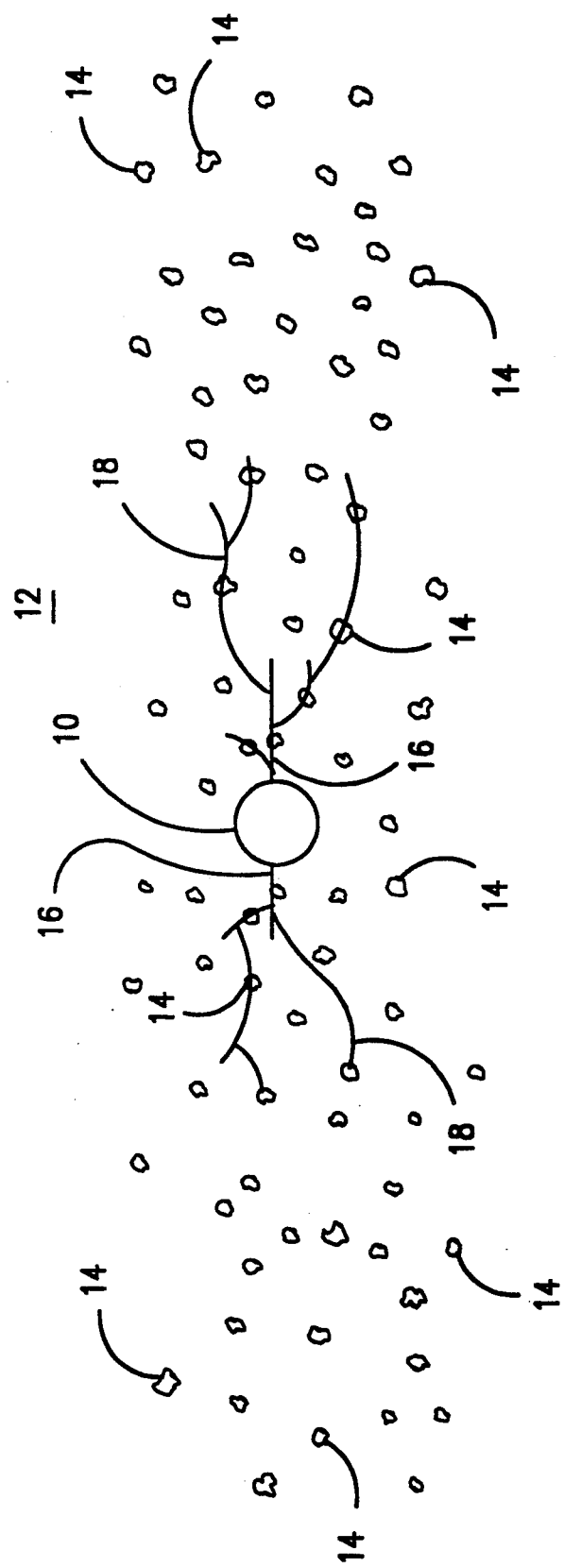
FIG. 1 is a schematic representation which shows a first extension of a fracture system being initially formed in a vuggy area of the formation.

In the practice of this invention, referring to FIG. 1, hydraulic fracturing is conducted in wellbore 10 so as to fracture hydraulically formation 12. A hydraulic fracturing technique is discussed in U.S. Pat. No. 4,067,389, which issued to Savins on Jan. 10, 1978. This patent is hereby incorporated by reference herein. Another method for initiating hydraulic fracturing is disclosed by Medlin et al. in U.S. Pat. No. 4,378,845 which issued on Apr. 5, 1983. This patent is also incorporated by reference herein. As is known to those skilled in the art, in order to initiate hydraulic fracturing in the formation, the hydraulic pressure applied must exceed the formation pressures in order to cause a fracture to form. The fracture which forms will generally run perpendicular to the least principal stress in the formation or reservoir.

A topical view of a hydraulically induced fracture appears in FIG. 1. As is shown, double-winged vertical fractures 16 emanate from wellbore 10. These fractures propagate parallel to the principal in-situ stresses in formation 12.

Once hydraulic fracturing has been completed to the extent desired, a solution of inhibited acid is injected into wellbore 10. The solution of acid employed may be any of the aqueous solutions of acid commonly employed for acidizing subterranean calcareous formation. For example, the solution of acid may be an aqueous solution of hydrochloric acid. Commonly, the aqueous solution of hydrochloric acid employed for acidizing subterranean calcareous formations contained between 5 and 28% by weight of hydrogen chloride. An aqueous solution of acidic acid may also be employed. Additionally, an aqueous solution of formic acid may be employed. As is known, when the acid solution becomes spent as the result of reacting with the material of the formation, the solubility of calcium sulfide i.e., anhydride or gypsum, dissolved in the acid decreases. Thus, any calcium sulfide dissolved from the formation or derived from water employed in preparing the solution of acid can precipitate with a consequent decrease in the permeability of the formation.

Accordingly, it is preferred that the solution of acid employed contain an agent to inhibit the precipitation of calcium sulfide. Thus, where hydrogen chloride is employed, the solution thereof may contain up to 24% by weight of calcium chloride. Also, the solution of acid may contain any of the commonly employed inhibitors for preventing corrosion of metal equipment, such as casing, liner, or tubing in the well.

The amount of acid solution employed will vary according to the distance from the well and the fracture size for which acidizing is desired. The amount of solution of acid employed will also vary according to the extent to which the material or formation is to be dissolved. Preferably, the amount of acid should be one hydrocarbon pore volume of the portion of the formation to be acidized. However, lesser amounts may be employed. Generally, the amount employed will be that ordinarily employed in conventional, commercial acidizing operations. Use of these acids are discussed in U.S. Pat. No. 4,787,456 which issued to Jennings, Jr et al. on Nov. 29, 1988. This patent is hereby incorporated by reference herein.

Also, as disclosed in U.S. Pat. No. 3,233,672 that issued to Carpenter, inhibitors such as alkyl-substituted carboximides and alkyl-substituted sulfoxides, can be added to the acidizing solution. This patent is hereby incorporated by reference herein. As the acid moves along the face of the formed fracture, it etches it and forms channels therein.

Once the fractures have been acidized and etched as desired, a temporary blocking agent or diverting material is allowed to form a temporary plug or barrier in fracture 16. Once the temporary plug has formed, hydraulic fracturing is again applied to wellbore 10 so as to cause the fracture to be diverted into vugs 14 and formation 12. Since the fractures are diverted from main fracture 16 the resultant fractures which contact vugs 14 form a branch fracture 18 in formation 12. On repetition of the above procedures, a series of dendritic or branched fractures form to create multi-azimuth fractures. Plugging agents which can be used herein are discussed in U.S. Pat. No. 4,157,116 which issued to Coulter on Jun. 5, 1979. A pumpable gel mixture which can be used to stop fracture growth in an existing fracture is one comprised of hydropropyl guar gum. Methods for using this gum is mentioned in U.S. Pat. No. 4,787,456 which is incorporated by reference herein.

The pumpable gel mixture can include a particulate material such as benzoic acid flakes, or an oil soluble resin. These flakes and resins can be used in those situations where it is not desired to form a solid plug in the fractures which are subsequently formed but only to form a temporary plugging effect in the fracture so as to divert fracturing forces from an existing fracture across vugs 14.

Alternatively, hydropropyl guar gum can be made of a consistency so as to form a solid temporary gel in the fractures. Gel breakers can be placed in the guar gum mixture so as to cause the solid gel formed in the fractures to deteriorate after a desired time. These gel breakers are also mentioned in U.S. Pat. No. 4,787,456. A preferred concentration of hydropropyl guar gum will be in the amount from 0.70 to about 10.0 weight % of the mixture. In a particularly preferred embodiment, hydropropyl guar gum is used to form said mixture in an amount of about 7.2 weight % of said gel mixture.

A solid gel diverter can be formed from hydroxyethyl cellulouse (HEC) as well as hydropropyl guar gum. HEC is available from Hercules and Henkel Companies. If it is desired to vary the viscosity and stability characteristics of HEC, cross-linking of said solution with metallic salts can be utilized. Because of the molecular structure, guar and derivatized guar (hydropropyl guar) lend themselves more satisfactorily to cross-linking than HEC. Therefore, the cross-linked guars are most useful in the present invention. The base gel can consist of the guar in solution at the described concentrations, buffers are then used, depending on the cross-linker, to maintain a fluid pH necessary for the cross-linked reaction. Several methods have been developed and are known in the prior art, as has been suggested herein.

Other cross-linkers which can be used include salt solutions of transitional metals such as titanium, chromium and zirconium. Several cross-linker systems using titanium in solution have been developed by Dupont. These include titanium which can be combined with triethanolamine (TYZOR TE) and acetylacetonate (TYZOR AA), as examples. Because of their flexibility and utility, hydropropyl guar cross-linked with titanium is a very common present day fracturing fluid and is available from several service companies; these fluid systems are also known in the prior art. Although not developed to the extent of the titanium cross-linked gel systems, fluids cross-linked with zirconium and chromium are available through service companies.

In those situations where is it desired to have a diverter which is not soluble in acid, benzoic acid flakes or acid resistant resins can be utilized. Where clay hydration occurs in the formation, a salt containing solution such as sodium chloride, potassium chloride or ammonium chloride can be included in the fracturing fluid when the initial fracture is induced. The concentration of salt should be from about 1 to about 10% by weight.

Figure 2:
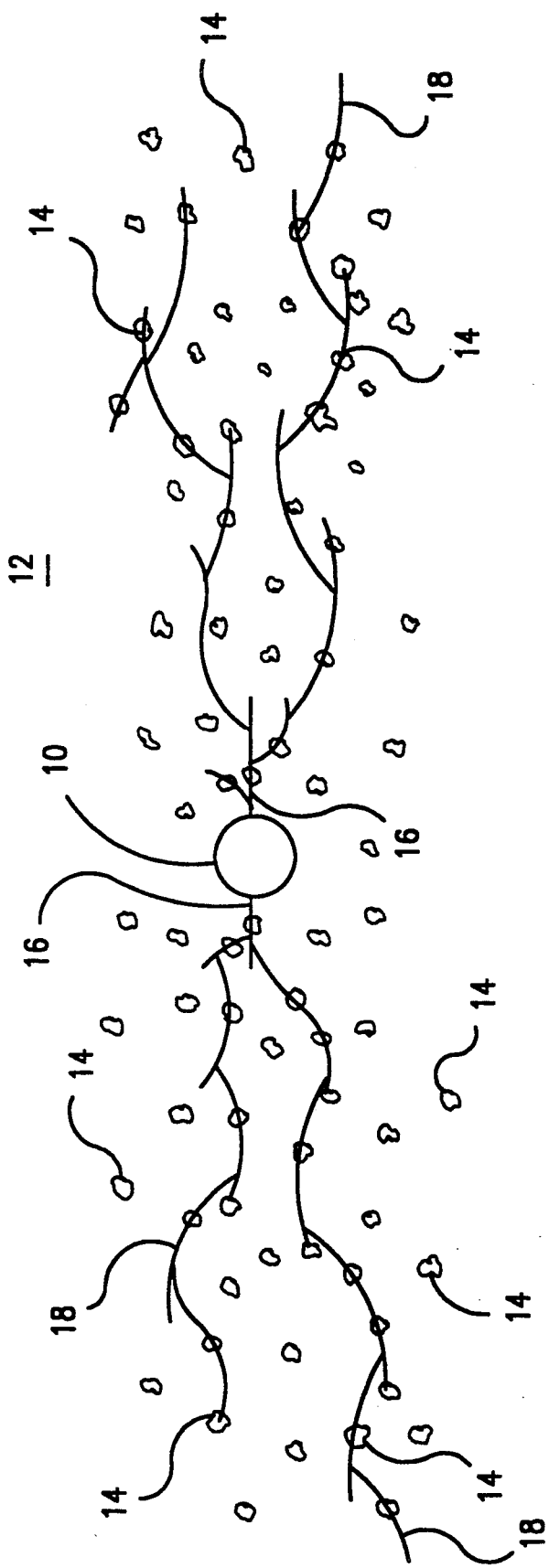
FIG. 2 is a schematic representation which depicts a second extension of the fracture system into a vuggy area of the formation.

As is shown in FIG. 2, by repeating the steps of fracturing, acidizing, and forming a gel diverting material in the fracture, a fracture system can be made to contact as many vugs in the formation as is desired. In this manner, the porosity of the formation may be substantially increased so as to more effectively drain the formation to remove hydrocarbonaceous containing fluids from hydrocarbon saturated vugs.

This method will also provide an effective way of interconnecting oil or gas saturated vugs. It also provides a method of obtaining additional fracture extension in an acid reactive formation during fracture acidizing. If desired, the gel diverting material may be made so as to be thermally stable. Thermal stability can be obtained from a proper formulation of the gellable material.

Once the formation has been fractured to contact and interconnect as many vugs in the formation as is desired, the gel or diverter material within said fractures is allowed to deteriorate and flow from the fracture along with fluids contained in the formation. Hydrochloric acid or another similar acid used while acidizing will also enhance the removal of the diverting material from the formation. Where it is desired to remove the resins or benzoic acid from the formation, organic solvent can be utilized. Additionally, it is in the purview and scope of this invention to prop the formation where needed with a proppant which is resistant to the acid or fracturing fluid which is used in this process.

Many other variations and modifications of this invention as previously set forth may be made without departing from the spirit and scope of this invention as those skilled in the art will readily understand. Such variations and modifications are considered part of the invention and within the purview and scope of the appended claims.

What is claimed is:

1. A method to improve fracture acidizing in a carbonate containing formation comprising:
    a) hydraulically fracturing the formation with a fracturing fluid so as to form a fracture in the formation in a preferred direction;
    b) directing an acid into the fracture in an amount and concentration sufficient to etch said fracture's face thereby creating channels therein;
    c) introducing a viscous fluid into the fracture which fluid contains a material sufficient to prevent fracture growth in the existing fracture; and
    d) hydraulically fracturing within the existing fracture at a fracturing rate and pressure sufficient to create an additional fractured area as said material prevents fracturing forces from propagating the formed fracture further into the formation and directs another fracture into an unfractured area thereby interconnecting adjacent vuggy areas in the formation.

2. The method as recited in claim 1 where in step b) the acid is hydrochloric acid of a concentration of about 5 to about 28 volume %.

3. The method as recited in claim 1 where the fracturing fluid in step a) contains a salt selected from a member of the group consisting of sodium, potassium chloride, and ammonium chloride in an amount sufficient to inhibit clay hydration in said formation.

4. The method as recited in claim 1 where in step c) the viscous fluid comprises a solidifiable viscous gel capable of forming a thermally stable solid gel.

5. The method as recited in claim 1 where in step b) said materials for preventing fracture growth comprise benzoic acid flakes, or an oil soluble resin and where the viscous fluid is a gelled fluid.

6. The method as recited in claim 1 where in step b) the acid is inhibited, gelled or foamed to retard its reaction until said acid has reached a desired location within the fracture.

7. A method to improve fracture acidizing in a carbonate containing formation comprising:
   a) hydraulically fracturing the formation with a fracturing fluid so as to form a fracture in the formation in a preferred direction;
   b) directing an acid into the fracture in an amount and concentration sufficient to etch said fracture's face thereby creating channels therein;
   c) introducing a viscous fluid into the fracture which fluid contains a material sufficient to prevent fracture growth in the existing fracture;
   d) hydraulically fracturing within the existing fracture at a fracturing rate and pressure sufficient to create an additional fractured area as said material prevents fracturing forces from propagating the formed fracture further into the formation and directs another fracture into an unfractured area thereby interconnecting adjacent vuggy areas in the formation; and
   e) thereafter repeating steps b), c), and d) until a fracture system has been created in the formation which allows substantially increased drainage of hydrocarbonaceous fluids from the formation.

8. The method as recited in claim 7 where step b) the acid is hydrochloric acid of a concentration of about 5 to about 28 volume %.

9. The method as recited in claim 7 where the fracturing fluid in step a) contains a salt selected from a member of the group consisting of sodium, potassium chloride, and ammonium chloride in an amount sufficient to inhibit clay hydration in said formation.

10. The method as recited in claim 7 where in step c) the viscous fluid comprises a solidifiable viscous gel capable of forming a thermally stable solid gel.

11. The method as recited in claim 7 where in step b) said materials for preventing fracture growth comprise benzoic acid flakes, or an oil soluble resin and where the viscous fluid is a gelled fluid.

12. The method as recited in claim 7 where in step b) the acid is inhibited, gelled or foamed to retard its reaction until said acid has reached a desired location within the fracture.

* * * * *